April 30, 1968  A. R. HENNING  3,380,318
CABLE ASSEMBLY
Filed April 10, 1965
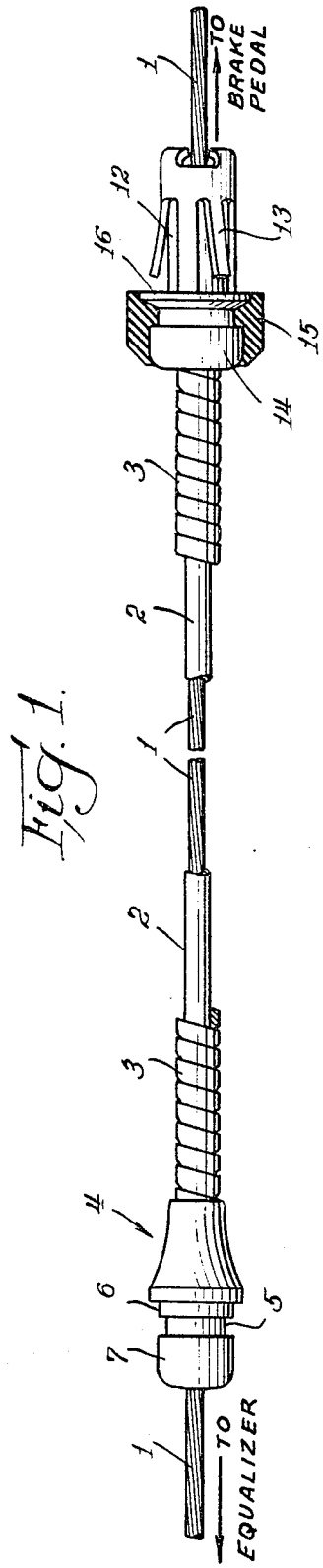
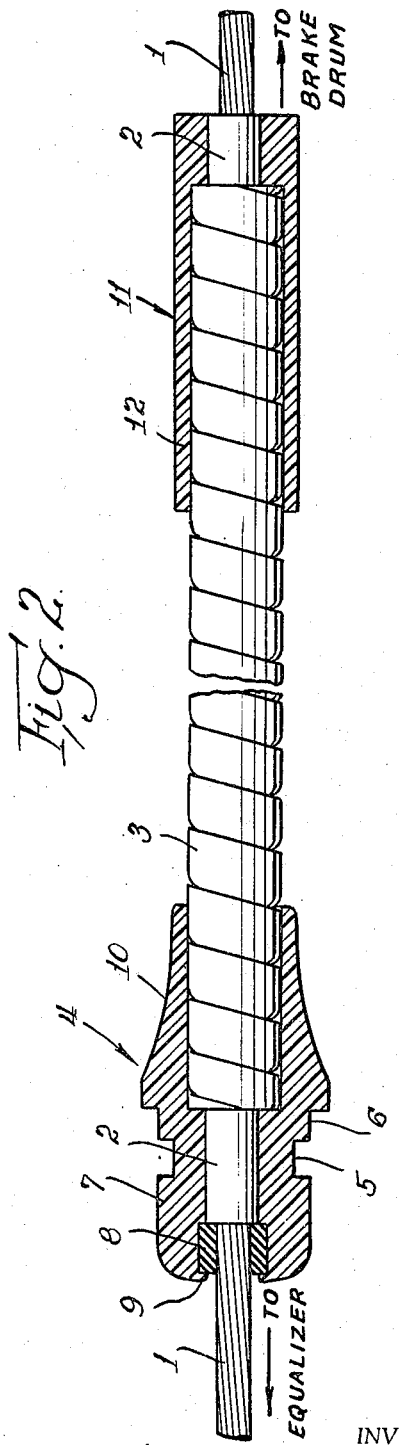
INVENTOR.
Andrew R. Henning

United States Patent Office 3,380,318
Patented Apr. 30, 1968

3,380,318
CABLE ASSEMBLY
Andrew R. Henning, Battle Creek, Mich., assignor to Shakespeare Company, Kalamazoo, Mich., a corporation of Michigan
Filed Aug. 10, 1965, Ser. No. 478,597
11 Claims. (Cl. 74—501)

ABSTRACT OF THE DISCLOSURE

A cable assembly is provided comprising a cable having an outer helical metal sheath, an inner plastic tubular liner, and a flexible cable disposed within the liner. An end fitting in the form of a ferrule is applied at an end of the cable. A suitably designed mold having a mold cavity designed to form a ferrule is placed around the end of the cable and a plastic material is injected under heat and pressure into the mold cavity to form an end fitting having one end adapted to be affixed to a base such as a brake housing, and having the other end molded directly on and affixed to both the helical metal sheath of the cable and the inner plastic liner.

---

The present invention relates to flexible transmission cables, and is more particularly concerned with a novel cable assembly having unique end fittings for affixing the cable housing to supporting structures as well as to control means and to actuating means.

Flexible transmission cables are used for many purposes, such as for transmitting force from control means to actuating means. Such cables are used, for example, as throttle controls, steering controls, and shift controls for power boats, and as brake and other controls for automobiles or airplanes. Such flexible cables as are known in the art have generally utilized metallic end fittings which must be clamped, swaged, staked, or otherwise affixed to the cable housing. Fittings of these types are expensive to produce, often difficult and expensive to affix to the cable, and frequently not waterproof when affixed. It would be highly desirable to have available a flexible transmission cable with included fittings which was economical to produce, equally acceptable on a strength basis, and which suffered from none of the aforementioned disadvantages of known cable structures.

It is an object of the present invention to provide a flexible cable assembly having end fittings which are relatively inexpensive to produce. It is a further object to provide such flexible cables having end fittings which are readily secured thereto and which, once affixed, remain affixed even when large forces are applied thereto. It is a further object to provide fittings of the type described having provision for sealing lubricant within the system and/or preventing water from entering. The accomplishment of the foregoing and additional objects will become more fully apparent hereinafter.

The invention in its preferred embodiment is illustrated by the accompanying drawings in which:

FIG. 1 is an elevational view of a flexible cable assembly according to the invention, indicating conventional connections for use as a front parking brake cable, and FIG. 2 is an enlarged elevational view partly in cross-section of the cable assembly of FIG. 1, but indicating conventional connections for use as a rear parking brake cable.

According to the invention, a flexible cable assembly is provided comprising a flexible outer sheath, a flexible inner tubular liner, and a metallic cable slideably mounted within the bore of the tubular liner. One end of the flexible sheath and an end of the tubular liner, preferably an end of the liner extending beyond the end of the sheath, are placed in a mold suitably designed for forming a ferrule. A plastic material is introduced into the mold and subjected to suitable molding conditions. As a result, a plastic ferrule is simultaneously formed and restrainably affixed to both the sheath and the liner, resulting in an integral structure of great mechanical strength.

Reference is now made to the accompanying drawing for a better understanding of the invention, wherein all the parts are numbered and wherein the same numbers are used to refer to corresponding parts throughout.

Referring to the drawing, the flexible cable assembly shown in FIG. 1 comprises a flexible metallic cable 1 slideably mounted within the bore of a tubular plastic liner 2. Mounted over the tubular liner is a flexible outer sheath 3 comprising a metallic strip helically wound in relatively short lay about the tubular liner 2. Mounted at one end of the cable is an end fitting in the form of a ferrule 4. The ferrule 4 has means at its hookup end 7 for being fixedly mounted in a circular opening of a vehicle frame, as by a C clamp, comprising a deep annular groove 5 adapted to receive a locking ring or washer, and a shallow annular groove 6 adapted to be inserted in the frame opening in which the ferrule is to be mounted. When the ferrule is so inserted and the locking ring properly positioned, the ferrule is maintained in fixed position within the opening.

As shown in FIG. 2, the hookup end 7 is further provided with a cylindrical chamber in which a sealing washer 8 of a flexible sealing material such as neoprene, polytetrafluoroethylene, polyethylene, or the like, is mounted and retained by a flange 9. The sealing washer 8 may alternatively be frictionally retained or adhesively affixed as by heat sealing or by the application of an external adhesive. The other end of the ferrule 4 has a tapered portion 10 which is provided with a large bore within which the outer sheath 3 is disposed and restrainably affixed. The ferrule 4 is also provided with an adjacent centrally located smaller bore within which the tubular liner 2 is disposed and restrainably affixed.

The ferrule of the present invention is simultaneously formed and affixed to the ends of the outer sheath 3 and tubular liner 2, as by molding. According to the method of the invention, the tubular liner 2 is inserted in the channel of the outer sheath 3, preferably with a portion of the liner extending beyond the end of the sheath. A metallic or wooden plug is then desirably placed in the bore of the liner 2 in order to support the wall thereof during the subsequent molding operation. The end of the assembly is then placed in a mold suitably designed for forming the ferrule. A suitable plastic molding compound is injected into the mold and subjected to molding conditions such as heat and pressure. This causes the ferrule to be molded and simultaneously restrainably affixed directly to both the end of the outer sheath 3 and the end of the tubular liner 2, with the result that both the sheath and the liner are restrained both axially and preferably also rotatively within the ferrule.

After the ferrule has been formed and affixed to the sheath 3 and liner 2, a sealing washer 8 is inserted within a channel provided in the hookup end 7, the washer 8 being retained by the flange 9. The cable 1 may then be inserted into the bore of the liner 2 and through the bore of the sealing washer 8.

At the other end of the cable assembly, as shown in FIG. 2, is a somewhat modified embodiment of the invention comprising a ferrule 11 in the form of a tubular sleeve 12. The sleeve 12 may be affixed to a supporting frame of a vehicle by means of a conventional snap fitting 13 cooperating with a retaining assembly comprising a cap 14, a sealing member 15, and a washer 16. The sleeve 11 is shown in greater detail in FIG. 2, and is comprised of a tubular wall 12 having the outer sheath 3 disposed within the bore thereof. An extending end of the tubular liner 2 is shown disposed within a bore of reduced size provided in the end of the sleeve 11. The cable 1 is disposed within and extends from the bore of the liner 2.

In a preferred embodiment, the sleeve 11 may be formed and affixed to the sheath 3 and liner 2 by direct molding in a manner similar to that described above with regard to ferrule 4. Utilizing this method, the sheath 3 and liner 2, preferably extending a short distance beyond the end thereof, are placed in a suitable mold and the plastic material, of which the sleeve 11 is to be formed, is injected therein and compressed under suitable conditions of heat and pressure. This results simultaneously in formation of the sleeve and restrainable engagement of both sheath 3 and liner 2. Alternatively, for certain applications, and particularly when the other end of the cable assembly is provided with a fitting such as the ferrule 4, the sleeve may be separately formed as by molding, and subsequently inserted over both the sheath 3 and liner 2 free of restrainable engagement.

The ferrule of the invention may be molded of any suitable high strength plastic material, whether filled or unfilled. The preferred material is a filled polypropylene molding compound. The sleeve 11 may be molded from similar materials. Other suitable plastic materials are phenol-formaldehyde resins, ureaformaldehyde resins, polystyrene, acrylics, polyvinyl resins, polyester resins, and the like.

The tubular liner 2 may be comprised of any suitable plastic material which is flexible and extrudable into a tube. Among suitable materials are acetal resin (e.g., Delrin or Celcon), nylon, polyethylene, polypropylene, Teflon-lined tubes of other plastics, et cetera.

The outer sheath may be formed of a helically wound metal ribbon, or plastic material. If a highly flexible plastic material is used, the sheath may alternatively be in the form of a straight tube, although preferably not one with a smooth outer surface if a considerable degree of rotative restraint is required. In the embodiment shown in the drawings, one edge of the helically wound strip is radiused to facilitate flexing. In flexing, the shoulders work over one another in such a manner that the cable does not elongate. It is generally preferred that the inner liner be unrestrainably mounted with respect to the outer sheath. However, for certain applications the tubular liner may be restrained within the outer sheath as by crimping or use of a tightly wound long-lay metal sheath.

The sealing washer in the embodiment shown is retained in place by the flange 9. Alternatively, the washer may be snapped in and frictionally retained in the molded cavity, or may be adhesively secured as by heat sealing or by the application of a separate adhesive.

The ferrule 11, which is in the form of a cylindrical sleeve, is preferably molded to the sheath and to the tubular liner in the same manner as the ferrule 4. However, for certain applications, the outer sheath 3 may be left floating free in the sleeve 11 and free to move longitudinally within the sleeve. Additionally, for certain applications, the tubular liner 2 may also be left free of restraint with respect to the sleeve 11. Such structure may in some cases be desirably utilized when the ferrule at the other end of the cable is retentatively affixed to both the sheath and the tubular liner. Moreover, for some applications, either or both of the outer sheath 3 and the inner liner 2 may be provided with an out-turned lip or flange at either or both ends, thus providing greater axial restraint. Such embodiment has special interest where rotative restraint is not essential or where rotation of the sheath and/or liner within the ferrule is actually desired, in which case the materials comprising the sheath and/or liner and the ferrule are suitably chosen so as not to provide rotational restraint upon molding.

The cable assembly of the present invention, as illustrated in the drawing and described above, is particularly suitable for use as a parking brake cable. The cable assembly in the exact form shown in the drawing is suitable for use in conjunction with either a front or rear parking brake. However, for illustrative purposes, FIG. 1 has been provided with a legend showing conventional connections for use in conjunction with front parking brakes, while FIG. 2 has been provided with a legend showing conventional connections for use of the structure as a rear parking brake cable. The equalizers are conventionally connected to suitable controls, as will be recognized by one skilled in the art.

For most applications a cable assembly utilizing the ferrule 4 at one end and a sleeve type of ferrule 11 at the other end is preferred. Alternatively, especially where water-tightness or similar properties are desired, ferrules of the type designated by the numeral 4 may be utilized at both ends of the cable. Sleeve-type ferrules of the type designated by the numeral 11 may sometimes be utilized at both ends of the cable, as in cases where entry of moisture or moisture-vapor or the like presents no problem.

The flexible cable assembly of the present invention has a number of advantages over similar prior art structures. It is leakproof, waterproof, and economical. The use of plastic ferrules avoids the need for many of the operations necessary when utilizing metal ferrules, such as compressing, staking, and swaging. The plastic material of which the ferrule is molded is relatively inexpensive and readily molded by commonly known and conventionally employed molding methods. The simultaneous molding of the ferrule and affixing thereof directly onto the end or ends of the cable sheath and liner reduces the cost of assembly and additionally results in a structure having excellent mechanical strength, as well as other highly desirable properties, many of which have not been available previously in similarly functional structures.

It is to be understood that the invention is not limited to the exact details of construction, operation, or exact materials or embodiments shown and described, as obvious modifications and equivalents will be apparent to one skilled in the art, and the invention is therefore to be limited only by the scope of the appended claims.

I claim:

1. In a cable assembly comprising a flexible outer sheath and a flexible tubular liner contained within said sheath comprised of a plastic material and adapted for having a cable slideably positioned within the bore thereof, the improvement comprising a ferrule formed of a moldable plastic material mounted at one end of said assembly having a bore at one end thereof within which said outer sheath is disposed and a smaller bore adjacent thereto within which a portion of said liner is disposed, said ferrule being directly molded and axially restrainably affixed to both said outer sheath and said liner.

2. A cable assembly according to claim 1 wherein said outer sheath comprises a helically wound metallic strip.

3. A cable assembly according to claim 1 wherein said ferrule is provided at one end with a chamber having a flexible sealing washer mounted therein, said washer being provided with a bore adapted for slideable positioning of said cable therethrough and adapted for sealing the space between said ferrule and said cable.

4. A cable assembly according to claim 1 wherein said ferrule is provided with grooves adapted for retentatively mounting said ferrule in a frame having a corresponding opening.

5. In a cable assembly comprising a flexible outer sheath and a flexible tubular liner contained within said sheath comprised of a plastic material and a cable slideably positioned within the bore thereof, the improvement comprising a ferrule formed of a moldable plastic material mounted at one end of said assembly having a bore at one end thereof within which said outer sheath is disposed and a smaller bore adjacent thereto within which a portion of said liner extending beyond the end of said outer sheath is disposed, said ferrule being directly molded and axially restrainably affixed to both said outer sheath and said liner.

6. In a cable assembly comprising a flexible outer sheath and a flexible tubular liner contained within said sheath comprised of a plastic material and adapted for having a cable slideably positioned within the bore thereof, the improvement comprising a ferrule formed of a moldable plastic material mounted at one end of said assembly having a bore at one end thereof within which said outer sheath is disposed and a smaller bore adjacent thereto within which a portion of said liner is disposed, said ferrule being directly molded and axially restrainably affixed to both said outer sheath and said liner, and a sleeve mounted at the other end of said cable assembly comprised of a plastic material and having a bore at one end within which the end of said outer sheath is disposed, and a reduced bore adjacent thereto within which a portion of the end of said tubular liner is disposed.

7. A cable assembly according to claim 6 wherein said sleeve is directly molded and axially restrainably affixed to both said sheath and said liner.

8. A cable assembly according to claim 6 wherein said ferrule is provided at one end with a chamber having a flexible sealing washer mounted therein, said washer being provided with a bore adapted for slideable positioning of said cable therethrough and adapted for sealing the space between said ferrule and said cable.

9. In a cable assembly comprising a flexible outer sheath and a flexible tubular liner contained within said sheath comprised of a plastic material and a cable *slideably* positioned within the bore thereof, the improvement comprising a ferrule formed of a moldable plastic material mounted at one end of said assembly having a bore at one end within which said outer sheath is disposed and a smaller bore adjacent thereto within which a portion of said liner extending beyond the end of said outer sheath is disposed, said ferrule being directly molded and restrainably affixed both axially and rotatively to both said outer sheath and said liner, and a sleeve mounted at the other end of said cable assembly comprised of a plastic material and having a bore at one end within which the end of said outer sheath is disposed, and a reduced bore at the other end through which a portion of the end of said tubular liner extending beyond the end of said flexible sheath is disposed.

10. A cable assembly according to claim 9 wherein said sleeve is directly molded and both axially and rotatively restrainably affixed to both said sheath and said liner.

11. A cable assembly according to claim 10 wherein said ferrule is provided at one end with a chamber having a flexible sealing washer mounted therein, said washer being provided with a bore through which said cable is positioned and adapted for sealing the space between said ferrule and said cable.

References Cited

UNITED STATES PATENTS

| | | | |
|---|---|---|---|
| 1,543,356 | 6/1925 | Arnold. | |
| 2,030,672 | 2/1936 | Winning | 74—502 |
| 2,732,861 | 1/1956 | Gilmore | 74—501 X |
| 2,858,708 | 11/1958 | Brickman | 74—501 |
| 2,933,019 | 4/1960 | Milton et al. | |
| 3,027,352 | 3/1962 | Walling et al. | |
| 3,076,786 | 2/1963 | Brown et al. | |
| 3,101,205 | 8/1963 | Benham | 248—48 X |
| 3,190,084 | 6/1965 | Moon et al. | 74—501 X |
| 3,221,572 | 12/1965 | Swick | 74—501 |
| 3,273,417 | 12/1966 | Sevrence | 74—501 |

OTHER REFERENCES

Wilson, R. H. et al., Industrial Medicine and Surgery, November 1954, pp. 479–485, Toxicology of Plastics and Rubber.

FRED C. MATTERN, JR., *Primary Examiner.*

C. F. GREEN, *Assistant Examiner.*